(12) United States Patent
Yu

(10) Patent No.: US 11,073,719 B2
(45) Date of Patent: Jul. 27, 2021

(54) LIQUID CRYSTAL DISPLAY PANEL AND METHOD FOR FABRICATING SAME

(71) Applicant: TCL CHINA STAR OPTOELECTRONICS TECHNOLOGY CO., LTD., Shenzhen (CN)

(72) Inventor: Yun Yu, Shenzhen (CN)

(*) Notice: Subject to any disclaimer, the term of this patent is extended or adjusted under 35 U.S.C. 154(b) by 0 days.

(21) Appl. No.: 16/627,299

(22) PCT Filed: Dec. 17, 2019

(86) PCT No.: PCT/CN2019/125839
§ 371 (c)(1),
(2) Date: Dec. 29, 2019

(87) PCT Pub. No.: WO2021/082214
PCT Pub. Date: May 6, 2021

(65) Prior Publication Data
US 2021/0124212 A1   Apr. 29, 2021

(30) Foreign Application Priority Data

Oct. 29, 2019  (CN) .......................... 201911034715.8

(51) Int. Cl.
*G02F 1/1339* (2006.01)
*G02F 1/1335* (2006.01)
*G02F 1/1341* (2006.01)

(52) U.S. Cl.
CPC ...... *G02F 1/133514* (2013.01); *G02F 1/1339* (2013.01); *G02F 1/1341* (2013.01); *G02F 1/133512* (2013.01)

(58) Field of Classification Search
CPC .................................................. G02F 1/1339
See application file for complete search history.

(56) References Cited

U.S. PATENT DOCUMENTS

| 2002/0063839 | A1  | 5/2002 | Matsumoto |
| 2005/0094062 | A1* | 5/2005 | Cheng ............... G02F 1/133512 349/110 |
| 2010/0188632 | A1* | 7/2010 | Takahashi ........... G02F 1/13394 349/155 |
| 2015/0160485 | A1  | 6/2015 | Li et al. |

FOREIGN PATENT DOCUMENTS

| CN | 103777406 A | 5/2014 |
| CN | 104503133 A | 4/2015 |
| CN | 105093626 A | 11/2015 |
| CN | 206431397 U | 8/2017 |
| CN | 109445177 A | 3/2019 |
| TW | 571164 B | 1/2004 |

* cited by examiner

Primary Examiner — James A Dudek

(57) ABSTRACT

A liquid crystal display panel and a method for fabricating the same are disclosed. The liquid crystal display panel comprises a first transparent substrate and a second transparent substrate opposite to each other, a sealant, and a liquid crystal layer. A metal layer and a blue color-resist are disposed over a peripheral region of the first transparent substrate, and the sealant is disposed between the first transparent substrate and the second transparent substrate, contacting the second transparent substrate and the blue color-resist. The liquid crystal layer is disposed between the first transparent substrate and the second transparent substrate and adjacent to the sealant and the blue color-resist.

5 Claims, 4 Drawing Sheets

1000

```
┌─────────────────────────────────────────────────────────────┐
│ Providing a first transparent substrate with a metal layer  │── S1001
│ and a blue color-resist sequentially formed in a peripheral │
│ region                                                      │
└─────────────────────────────────────────────────────────────┘
                              │
                              ▼
┌─────────────────────────────────────────────────────────────┐
│ Providing a second transparent substrate with a light-      │
│ shielding layer formed in the peripheral region, wherein    │── S1003
│ the light-shielding layer comprises a cutout region         │
│ exposing a portion of the second transparent substrate      │
└─────────────────────────────────────────────────────────────┘
                              │
                              ▼
┌─────────────────────────────────────────────────────────────┐
│ Coating a sealing material in the cutout region of the      │── S1005
│ second transparent substrate                                │
└─────────────────────────────────────────────────────────────┘
                              │
                              ▼
┌─────────────────────────────────────────────────────────────┐
│ Making the second transparent substrate contact with the    │── S1007
│ first transparent substrate, wherein the sealing material   │
│ aligns with the blue resist in the peripheral region of the │
│ first transparent substrate                                 │
└─────────────────────────────────────────────────────────────┘
                              │
                              ▼
┌─────────────────────────────────────────────────────────────┐
│ Performing a photo-curing process, irradiating light from   │
│ the surface of the second transparent substrate without the │── S1009
│ light-shielding layer and making light passing trough the   │
│ cutout region of the light-shielding layer of the second    │
│ transparent substrate to cure the sealing material into a   │
│ sealant                                                     │
└─────────────────────────────────────────────────────────────┘
                              │
                              ▼
┌─────────────────────────────────────────────────────────────┐
│ Injecting a liquid crystal material between the first       │
│ transparent substrate and the second transparent substrate  │── S1011
│ to form a liquid crystal layer adjacent to the light        │
│ shielding layer, the sealant, the blue color-resist, and    │
│ the metal layer.                                            │
└─────────────────────────────────────────────────────────────┘
```

FIG. 3

LIQUID CRYSTAL DISPLAY PANEL AND METHOD FOR FABRICATING SAME

FIELD OF INVENTION

The present invention relates to a display technology, and more particularly to a liquid crystal display panel and a method for fabricating the same.

BACKGROUND

In the prior art, liquid crystal displays have become the most widely used display devices by virtue of their clear picture quality, wide viewing angles, beautiful color and relatively low prices. A liquid crystal display panel used in the liquid crystal display mainly comprises a color filter substrate (CF substrate), an array substrate (thin-film transistor array substrate, TFT array substrate), liquid crystals (LC) filled therebetween, and a sealant for sealing.

Curing sealant of the liquid crystal display panel is generally performed on a side of an array substrate of the liquid crystal display panel, and light is irradiated through gaps between traces at the edge of the array substrate and arrives the sealant to cure thereof. However, with the development of narrow bezel technology of the liquid crystal display panel, a non-display area of the liquid crystal display panel is gradually reduced, so that the density of traces at the edge of the array substrate become higher, that is, gaps between the traces at the edge of the array substrate is getting smaller and smaller, so that the amount of light that irradiates the sealant through the gaps between the traces is less and less. Thus, the sealant cannot be completely cured, and the curing effect of the sealant is affected, thereby causing quality problems such as liquid crystal contamination and insufficient tension of the sealant, which in turn affects the quality of the liquid crystal display panel.

Therefore, it is necessary to provide a liquid crystal display panel to solve the problems encountered in the abovementioned liquid crystal display panel.

SUMMARY

With the development of the narrow bezel technology of the liquid crystal display panel, a non-display area of the liquid crystal display panel is gradually reduced, so that traces at the edge of the array substrate become more and more dense, that is, gaps between the traces at the edge of the array substrate is getting smaller and smaller, so that the amount of light that irradiates and arrives the sealant through the gaps between the traces is less and less. Thus, the sealant cannot be completely cured, and the curing effect of the sealant is affected, thereby causing quality problems such as liquid crystal contamination and insufficient tension of the sealant, which in turn affects the quality of the liquid crystal display panel.

In view of this, the present invention provides a liquid crystal display panel to solve the quality problems such as liquid crystal contamination and insufficient tension of the sealant in the prior art.

In order to achieve the foregoing object of the present invention, an embodiment of the present invention provides a liquid crystal display panel, comprising a first transparent substrate and a second transparent substrate opposite to each other, a sealant, and a liquid crystal layer. A metal layer and a blue color-resist are disposed over a peripheral region of the first transparent substrate, and the sealant is disposed between the first transparent substrate and the second transparent substrate, contacting the second transparent substrate and the blue color-resist. The liquid crystal layer is disposed between the first transparent substrate and the second transparent substrate and adjacent to the sealant and the blue color-resist.

In one embodiment, the second transparent substrate further comprises a light shielding layer disposed over the second transparent substrate, surrounding the sealant.

In one embodiment, the metal layer is disposed between the blue color-resist and the first transparent substrate.

In one embodiment, there is a gap of more than 5 micrometers between the light shielding layer and the sealant.

In one embodiment, the peripheral region comprises a cutout region exposing the second transparent substrate to accommodate the sealant, and each side of the metal layer is at least 5 micrometers greater than each side of the cutout region.

In addition, another embodiment of the present invention provides a method for fabricating a liquid crystal display panel, comprising: providing a first transparent substrate, wherein a metal layer and a blue color-resist are sequentially formed in a peripheral region of the first transparent substrate; providing a second transparent substrate, wherein a light shielding layer is formed in a peripheral region of the second transparent substrate, and the light shielding layer has a cutout region exposing a portion of the second transparent substrate; coating a sealing material in the cutout region of the second transparent substrate; contacting the second transparent substrate with the first transparent substrate, wherein the sealing material is aligned with the blue color-resist in the peripheral region of the first transparent substrate and contacts thereof; performing a photo-curing process, irradiating a light from a surface of the second light-transmitting substrate on which the light-shielding layer is not provided, making the light pass through the cutout region of the light-shielding layer of the second transparent substrate to cure the sealing material into an sealant; and injecting a liquid crystal material between the first transparent substrate and the second transparent substrate to form a liquid crystal layer adjacent to the light-shielding layer, the sealant, the blue color-resist, and the metal layer.

In one embodiment, the first transparent substrate is an array substrate, and the second transparent substrate is a color filter substrate.

In one embodiment, the light-shielding layer surrounds the sealant.

In one embodiment, there is a gap of more than 5 micrometers between the light shielding layer and the sealant.

In one embodiment, each side of the metal layer is at least 5 micrometers greater than each side of the cutout region.

Compared with the prior art, the liquid crystal display panel and the method for fabricating the same of the present invention forms a cutout in the light-shielding layer over the color filter substrate side corresponding to the sealant coating region, thereby realizing curing of the sealant by irradiating from the color filter substrate side. Curing of the sealant can be improved without increasing the difficulty of the process, and quality problems such as contamination of the liquid crystal caused by poor curing of the sealant and the effect of the tension of the sealant can be prevented. Since the light-shading layer is formed with a cutout therein, the aperture ratio can reach 100%, which can accelerate the curing of the sealant and improve the curing of the sealant. Since the sealant is cured by illuminating the light from the color filter substrate side, the gap between traces in the sealant region can be reduced, which is helpful for the narrow bezel design. At the same time, in order to prevent light leakage in the cutout of the light-shielding layer in the sealant region, a blue color-resist and a metal layer design are used at the corresponding region over the array substrate side to prevent reflection and light leakage. The light-shielding design of the frame region of the present invention in the peripheral region of the light-transmitting substrate is beneficial to the realization of a frameless display product, so as to improve product quality and product competitiveness.

BRIEF DESCRIPTION OF DRAWINGS

To detailly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

FIG. 3 is a flow chart showing a method for fabricating a liquid crystal display panel according to a first embodiment of the present invention.

DETAILED DESCRIPTION

Figure 1:
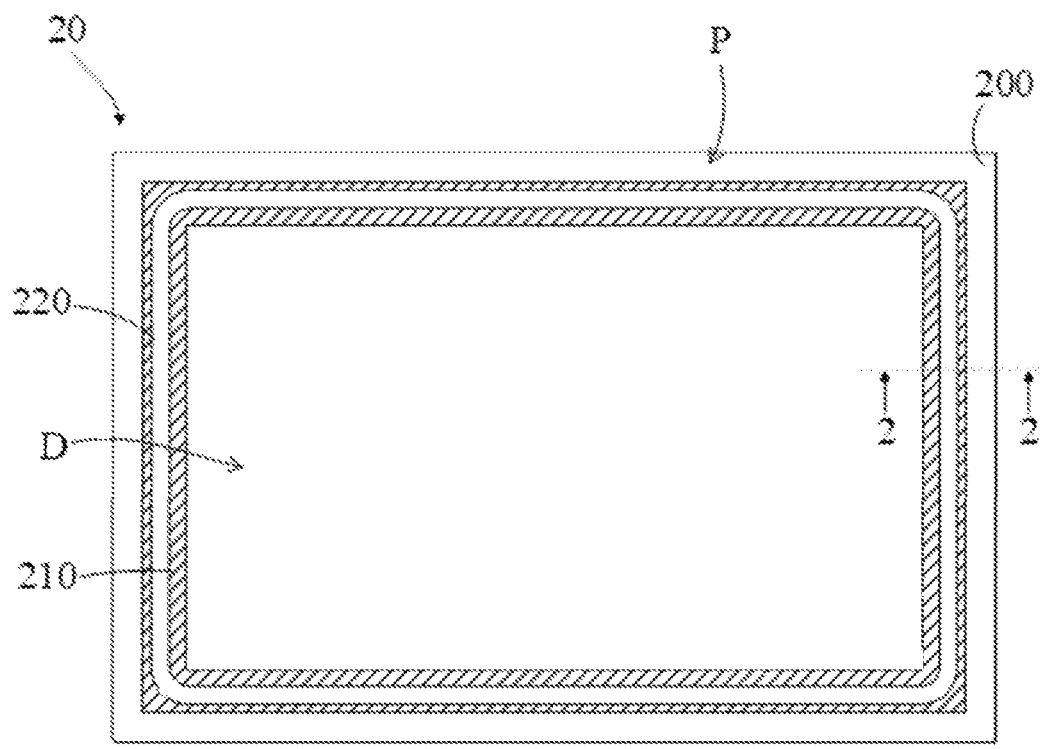
FIG. 1 is a schematic top view of a liquid crystal display panel according to a first embodiment of the present invention.

Please refer to the drawings in the drawings, in which the same reference numerals represent the same components. The following description is based on the specific embodiments of the present invention as illustrated and should not be construed as limiting the specific embodiments that are not described herein. The directional terms mentioned in the present invention, such as "upper", "lower", "before", "after", "left", "right", "inside", "outside", "side", etc., are only used to show direction in the figures. The directional terms used in the drawings are used to explain and explain the invention and are not intended to limit the scope of the invention.

Figure 2:
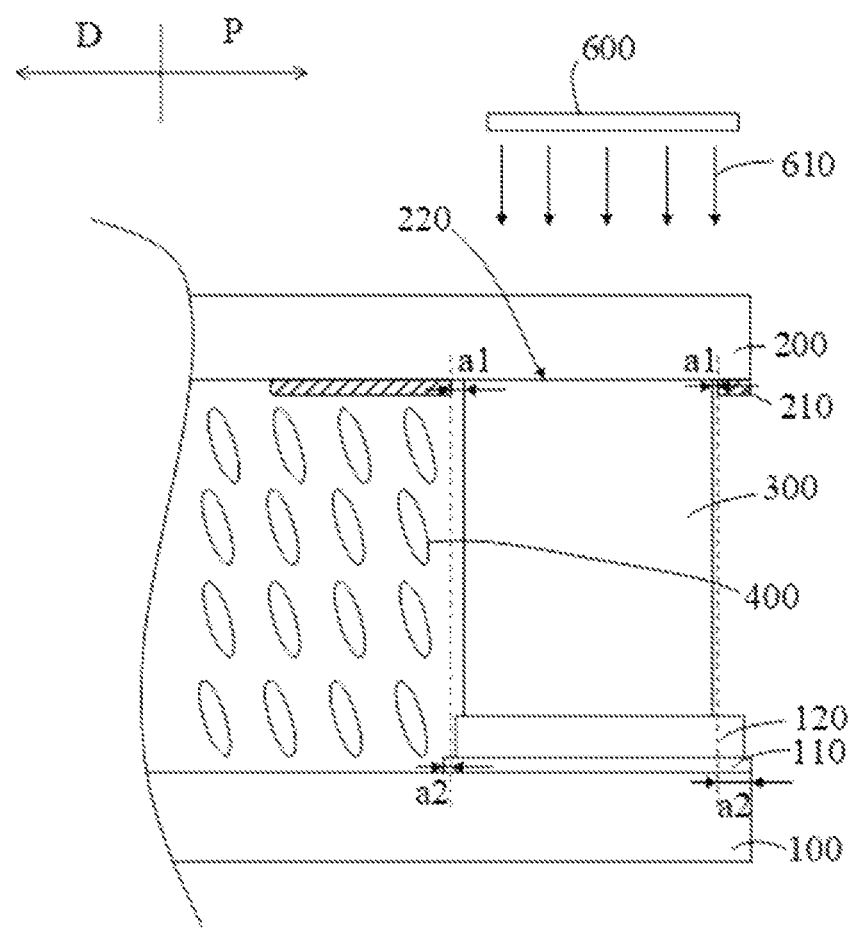
FIG. 2 is a schematic cross-sectional view at 2-2 of FIG. 1.

FIG. 1 is a schematic top view of a liquid crystal display panel 20 according to a first embodiment of the present invention, and FIG. 2 is a schematic cross-sectional view at 2-2 in FIG. 1.

Please refer to FIG. 1 and FIG. 2 at the same time, in this embodiment, the liquid crystal display panel 20 comprises a first transparent substrate 100 and a second transparent substrate 200 which are opposite to each other, a sealant 300, and a liquid crystal layer 400. The liquid crystal display panel 20 comprises a display region D located at the center and a peripheral region P surrounding the display region D outside the display region D. A metal layer 110 and a blue color-resist 120 are disposed in the peripheral region P of the first transparent substrate 100. The sealant 300 is disposed between the first transparent substrate 100 and the second transparent substrate 200 to contact the second transparent substrate 200 and the blue color-resist 120. The liquid crystal layer 400 is disposed between the first transparent substrate 100 and the second transparent substrate 200 and adjacent to the sealant 300 and the blue color-resist 120. The first transparent substrate 100 is an array substrate, and the second transparent substrate 200 is a color filter substrate. It can be understood that other elements used in the liquid crystal display panel 20 such as a thin film transistor (TFT), a pixel electrode, and a common electrode may be further disposed over the first transparent substrate 100 and the second transparent substrate 200, respectively. The illustration here is simplified and only the aforementioned elements are shown to describe the present invention.

As shown in FIG. 1, the second transparent substrate 200 covers the first transparent substrate 100, the sealant 300, and the liquid crystal layer 400. Therefore, only the second transparent substrate 200 and a black matrix layer 210 disposed over the surface of the second transparent substrate 200 facing the first transparent substrate 100 are shown in the schematic top view diagram. The light-shielding layer 210 is provided with a patterned cutout region 220. The cutout region 220 is disposed around the display region D and is surrounded by the light-shielding layer 210.

As shown in FIG. 2, a cross-sectional view of the display region D and the peripheral region P outside the display region D of the liquid crystal display panel 20 at 2-2 in FIG. 1 are partially shown. The metal layer 110 and the blue color-resist 120 are sequentially disposed over a surface of the first transparent substrate 100 in the peripheral region P facing the second transparent substrate 200. The metal layer 110 can be used as a trace electrically connected to a thin film transistor (TFT) on the first transparent substrate 100. A light-shielding layer 210 is disposed over a surface of the second transparent substrate 200 facing the first light-transmitting substrate 100 in the peripheral region P, and a cutout region 220 is provided in the light-shielding layer 210. The cutout region 220 exposes a portion of the second transparent substrate 200 facing the surface of the first transparent substrate 100 in the peripheral area P.

The sealant 300 is disposed between the first transparent substrate 100 and the second transparent substrate 200, and contacts the surface of the second transparent substrate 200 exposed by the cutout region 220 and in contact with the blue color-resist 120 over the surface of the first transparent substrate 100 in the periphery region P facing the second light-transmitting substrate 200. The liquid crystal layer 400 is disposed between the first transparent substrate 100 and the second transparent substrate 200, adjacent to the light-shielding layer 210, the sealant 300, the blue color-resist 120, and the metal layer 110.

The metal layer 110 over the first light-transmitting substrate 100 can be designed as a block to prevent light leakage, and the blue color-resist 120 over the metal layer 110 can prevent the light reflection of the metal layer 110, which is helpful for the realization of a no bezel design. There is a gap a1 of more than 5 micrometers between the light-shielding layer 210 and the sealant 300, so that when a light source 600 is used to irradiate light 610 from a side of the second transparent substrate 200 to cure the sealant 300, the problem of incomplete curing of the inner part of the sealant 300 caused by shielding of the light-shielding layer 210 is prevented, thereby improving curing effects of the sealant 300. In addition, each side of the metal layer 11 is at least 5 micrometers a2 wider than each side of the cutout region 220 to prevent light leakage due to shifting when assembling the first transparent substrate 100 and the second transparent substrate 200.

FIG. 3 is a flowchart of a method 1000 for fabricating the liquid crystal display panel 20 according to the first embodiment of the present invention, which mainly comprises the following steps S1001-S1011.

In step S1001, a first transparent substrate 100 is provided, and a metal layer 110 and a blue color-resist 120 are sequentially formed over a surface of the first transparent substrate 100 in a peripheral region P facing a second transparent substrate 200.

Next, in step S1003, a second light-transmitting substrate 200 is provided. A light-shielding layer 210 is formed in the peripheral region P of the second light-transmitting substrate 200. There is a cutout region 220 formed in the light-shielding layer 210 to expose a portion of the second transparent substrate 200.

Next, in step S1005, a sealing material is coated to the cutout region 220 of the second transparent substrate 200.

Next, in step S1007, the second transparent substrate is brought into contact with the first transparent substrate, and the sealing material is aligned with and in contact with the blue color-resist in the peripheral region of the first transparent substrate.

Next, in step S1009, a photo-curing process (not shown) is performed. The surface of the second transparent substrate 200 on which the light-shielding layer 210 is not provided is irradiated with light 610 and make the light 610 pass through the cutout region 220 of the light-shielding layer 210 of the second transparent substrate 200 to cure the sealing material. In the aforementioned photo-curing process, a mask (not shown) with a suitable pattern can be used, the light source 600 can be used to irradiate the light 610 from the side of the second transparent substrate 200 on which the light-shielding layer 210 is not provided, and the light 610 passes through the cutout region 220 in the light-shielding layer 210 of the second light-transmitting substrate 200 to cure the sealing material into sealant 300.

Next, in step S1011, a liquid crystal material is injected between the first transparent substrate 100 and the second transparent substrate 200 to form a liquid crystal layer 400 adjacent to the light shielding layer 210, the sealant 300, the blue color-resist 120, and the metal layer 110. After the sealing, the fabrication of the liquid crystal display panel 20 according to the first embodiment of the present invention is completed.

In summary, the liquid crystal display panel 20 and the method for fabricating the same of the present embodiment forms a cutout in the light-shielding layer over the color filter substrate side corresponding to the sealant coating region, thereby realizing curing of the sealant by irradiating from the color filter substrate side. Curing of the sealant can be improved without increasing the difficulty of the process, and quality problems such as contamination of the liquid crystal caused by poor curing of the sealant and the effect of the tension of the sealant can be prevented. Since the light-shading layer 210 is formed with a cutout therein, the aperture ratio can reach 100%, which can accelerate the curing of the sealant and improve the curing of the sealant. Since the sealant is cured by illuminating the light from the color filter substrate side, the gap between traces in the sealant region can be reduced, which benefits the narrow bezel design. At the same time, in order to prevent light leakage in the cutout of the light-shielding layer in the sealant region, a blue color-resist 120 and a metal layer 110 design are used at the corresponding region over the array substrate side to prevent reflection and light leakage. The light-shielding design of the frame region of the present invention in the peripheral region of the light-transmitting substrate is beneficial to the realization of a frameless display product, so as to improve product quality and product competitiveness.

In addition, the liquid crystal display panel and the method for fabricating the same of the present invention can also be applied to other types of liquid crystal display panels and manufacturing thereof, for example, liquid crystal displays using color filter on array (COA) technology which is integrated with a color filter and their fabrication.

Figure 4:
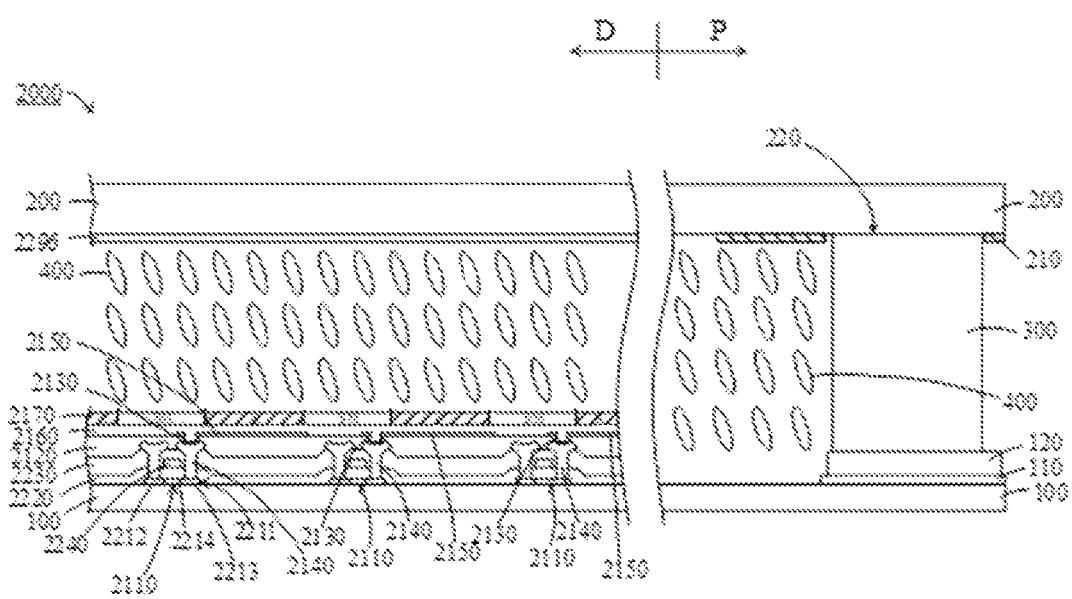
FIG. 4 is a schematic cross-sectional view showing a liquid crystal display panel of a second embodiment of the present invention.

Please refer to FIG. 4, a schematic cross-sectional view of a liquid crystal display panel 2000 according to a second embodiment of the present invention is provided. In this embodiment, the liquid crystal display panel 2000 is a liquid crystal display panel using a color filter on array (COA) technology.

As shown in FIG. 4, a display region D of the liquid crystal display panel 2000 and a portion of the structure in the peripheral region P outside the display region D are simultaneously shown. The liquid crystal display panel 2000 located in the display region D mainly comprises a plurality of display pixels, and three display pixels are illustrated here for illustration. A gate insulating layer 2220, an interlayer insulating layer 2230, a first planarization layer 2120, and a second planarization layer 2160 are sequentially disposed over the first transparent substrate 100. A semiconductor layer 2211 is provided between the gate insulating layer 2220 and the first transparent substrate 100, and it comprises a source region 2212, a drain region 2213, and a channel region 2214 therebetween. A gate 2240 is embedded between the interlayer insulating layer 2230 and the gate insulating layer 2220, and is generally located above the channel region 2214. The gate 2240, the gate insulating layer 2220, and the semiconductor layer 2211 form a transistor 2110 of a display pixel. Two conductive electrodes 2140 are disposed and penetrate the interlayer insulating layer 2230 and the gate insulating layer 2220, and contact the source region 2212 and the drain region 2213, respectively. An opening 2130 is formed over the first planarization layer 2120 to partially expose the top surface of the conductive electrode 2140 connected to the drain region 2213, and a transparent pixel electrode 2150 is provided over the opening 2130 exposed by the opening 2130 and over a portion of the second flat layer 2160 adjacent to the opening 2130. A plurality of light-shielding layers BM are disposed over the second flat layer 2160 separately, and each light-shielding layer BM overlaps the underlying transistor 2110. A color filter 2170 with colors such as red (R), green (G), and blue (B) is disposed between the plurality of light shielding layers BM. Here, R, G, and B are used in each color filter 2170 to note the colors, and each color filter 2170 overlaps the transparent pixel electrode 2150 below. In addition, a common electrode 2296 is formed over the second transparent substrate 200 facing the first transparent substrate 100. Since the liquid crystal display panel 2000 uses COA technology to integrate the color filter 2170 over the first transparent substrate 100, it is transparent over the second transparent substrate 100 and no color filter is formed over the second transparent substrate 200 at this time. A liquid crystal layer 400 is further formed on the second transparent substrate 200 and the first transparent substrate 100.

In addition, the structure in the peripheral region P outside the display region D of the liquid crystal display panel 2000 is the same as the structure shown in FIG. 2, and description is not repeated here. It is noted that the light-shielding layer 210 in the peripheral region P and the light-shielding layers BM in the display region D are separately formed, and the blue resist 210 in the peripheral region P and the color filter layer 2170 entitled B in the display region D can be formed simultaneously. The flowchart of the method 1000 for fabricating of the liquid crystal display panel 20 shown in FIG. 3 is also applicable to the manufacturing of the liquid crystal display panel 2000 shown in FIG. 4, and details are not described herein again.

As mentioned above, the liquid crystal display panel 2000 and the method for fabricating the same of the present invention forms a cutout in the light-shielding layer over the color filter substrate side corresponding to the sealant coating region, thereby realizing curing of the sealant by irradiating from the color filter substrate side. Curing of the sealant can be improved without increasing the difficulty of the process, and quality problems such as contamination of the liquid crystal caused by poor curing of the sealant and the effect of the tension of the sealant can be prevented. Since the light-shading layer 210 is formed with a cutout therein, the aperture ratio can reach 100%, which can accelerate the curing of the sealant and improve the curing of the sealant. Since the sealant is cured by illuminating the light from the color filter substrate side, the gap between traces in the sealant region can be reduced, which benefits the narrow bezel design. At the same time, in order to prevent light leakage in the cutout of the light-shielding layer in the sealant region, a blue color-resist 120 and a metal layer 110 design are used at the corresponding region over the array substrate side to prevent reflection and light leakage. The light-shielding design of the frame region of the present invention in the peripheral region of the light-transmitting substrate is beneficial to the realization of a frameless display product, so as to improve product quality and product competitiveness.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A liquid crystal display panel, comprising:
   a first transparent substrate and a second transparent substrate opposite to each other, wherein the first transparent substrate is an array substrate, the second transparent substrate is a color filter substrate, and a metal layer and a blue color-resist are disposed over a peripheral region of the first transparent substrate;
   a sealant disposed between the first transparent substrate and the second transparent substrate, contacting the second transparent substrate and the blue color-resist; and
   a liquid crystal layer disposed between the first transparent substrate and the second transparent substrate and adjacent to the sealant and the blue color-resist.

2. The liquid crystal display panel of claim 1, wherein the second transparent substrate further comprises a light shielding layer disposed over the second transparent substrate, surrounding the sealant.

3. The liquid crystal display panel of claim 1, wherein the metal layer is disposed between the blue color-resist and the first transparent substrate.

4. The liquid crystal display panel of claim 2, wherein there is a gap of greater than 5 micrometers between the light shielding layer and the sealant.

5. The liquid crystal display panel of claim 2, wherein the peripheral region comprises a cutout region exposing the second transparent substrate to accommodate the sealant, and each side of the metal layer is at least 5 micrometers greater than each side of the cutout region.

* * * * *